US008751213B2

(12) United States Patent
Wong et al.

(10) Patent No.: US 8,751,213 B2
(45) Date of Patent: *Jun. 10, 2014

(54) COMMUNITY TRANSLATION ON A SOCIAL NETWORK (71) Applicant: Facebook, Inc., Menlo Park, CA (US)

(72) Inventors: Yishan Wong, Mountain View, CA (US); Stephen M. Grimm, Sunnyvale, CA (US); Nicolas Vera, Palo Alto, CA (US); Marcel Laverdet, Palo Alto, CA (US); Ting Yin Kwan, Cupertino, CA (US); Christopher W. Putnam, Palo Alto, CA (US); Javier Olivan Lopez, Menlo Park, CA (US); Katherine P. Losse, Palo Alto, CA (US); Rebekah Cox, Mountain View, CA (US); Chad Little, Santa Clara, CA (US)

(73) Assignee: Facebook, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/929,742

(22) Filed: Jun. 27, 2013

(65) Prior Publication Data
US 2013/0289972 A1 Oct. 31, 2013

Related U.S. Application Data (63) Continuation of application No. 13/587,771, filed on Aug. 16, 2012, now Pat. No. 8,504,352, which is a continuation of application No. 12/329,288, filed on Dec. 5, 2008, now Pat. No. 8,271,260.

(60) Provisional application No. 61/005,614, filed on Dec. 5, 2007.

(51) Int. Cl.
G06F 17/28 (2006.01)

(52) U.S. Cl.
USPC .................................................. 704/2; 704/7

(58) Field of Classification Search
USPC ........................................................ 704/1–8
See application file for complete search history.

(56) References Cited

U.S. PATENT DOCUMENTS 7,983,897 B2 * 7/2011 Chin et al. ........................ 704/2
2001/0004396 A1    6/2001 Engelke
(Continued)

FOREIGN PATENT DOCUMENTS

JP    2002-123467    4/2002
JP    2003-030185    1/2003
(Continued)

OTHER PUBLICATIONS

Australian Government, IP Australia, Patent Examination Report No. 1, Australian Patent Application No. 2008333773, Aug. 30, 2012, three pages.

(Continued)

Primary Examiner — Samuel G Neway
(74) Attorney, Agent, or Firm — Fenwick & West LLP (57) ABSTRACT Embodiments of the invention provide techniques for translating text in a social network. In one embodiment translations of text phrases are received from members of the social network. These text phrases include content displayed in a social networking system, such as content from social networking objects. A particular member is provided with content including a text phrase in a first language, and the member requests translation into another language. Responsive to this request, a translation of the text phrase is selected from a set of available translations. The selection is based on actions by friends of the member in the social network, the actions being associated with the set of available translations. These actions can the viewing of or approval of translations by the friends, for example. The selected translation is then presented to the member requesting the translation.

26 Claims, 8 Drawing Sheets

(56) References Cited

U.S. PATENT DOCUMENTS

| | | | | |
|---|---|---|---|---|
| 2002/0193986 | A1* | 12/2002 | Schirris | 704/8 |
| 2003/0023422 | A1 | 1/2003 | Menezes et al. | |
| 2004/0041836 | A1 | 3/2004 | Zaner et al. | |
| 2005/0021323 | A1* | 1/2005 | Li | 704/5 |
| 2007/0294076 | A1* | 12/2007 | Shore et al. | 704/2 |
| 2008/0147378 | A1* | 6/2008 | Hall | 704/4 |
| 2009/0024595 | A1* | 1/2009 | Chen | 707/4 |

FOREIGN PATENT DOCUMENTS

| | | |
|---|---|---|
| JP | 2004-070783 | 3/2004 |
| JP | 2004-164599 | 6/2004 |
| WO | WO 2007/070558 | 6/2007 |

OTHER PUBLICATIONS

Canadian Intellectual Property Office, Office Action, Canadian Patent Application No. 2,705,133, Mar. 1, 2012, two pages.

Canadian Intellectual Property Office, Office Action, Canadian Patent Application No. 2,705,133, Apr. 5, 2013, three pages.

European Patent Office, "Notice from the European Paent Office dated Oct. 1, 2007 Concerning Business Methods," *Official Journal of the European Patent Office*, Nov. 1, 2007, pp. 592-593, vol. 30, No. 1.

European Patent Office, Supplementary European Search Report, European Patent Application No. 08858370.3, Oct. 18, 2010, six pages.

Japanese Patent Office, Office Action, Japanese Patent Application No. JP 2010-537123, Jan. 15, 2013, five pages.

PCT International Preliminary Report on Patentability, PCT Application No. PCT/US2008/085727, Jun. 8, 2010, six pages.

PCT International Search Report and Written Opinion, PCT Application No. PCT/US2008/085727, Feb. 12, 2009, nine pages.

State Intellectual Property Office of the People's Republic of China, Office Action, Chinese Patent Application No. 200880119336.2, Jul. 18, 2012, nine pages.

State Intellectual Property Office of the People's Republic of China, Office Action, Chinese Patent Application No. 200880119336.2, Aug. 15, 2011, eight pages.

United States Office Action, U.S. Appl. No. 13/587,771, Sep. 25, 2012, seven pages.

United States Office Action, U.S. Appl. No. 13/587,771, Feb. 7, 2013, six pages.

\* cited by examiner

COMMUNITY TRANSLATION ON A SOCIAL NETWORK

CROSS REFERENCE TO RELATED APPLICATIONS

This application is a continuation of U.S. patent application Ser. No. 13/587,771, filed on Aug. 16, 2012, entitled "Community Translation on a Social Network," which is a continuation of U.S. Pat. No. 8,271,260, filed on Dec. 5, 2008, entitled "Community Translation on a Social Network," which claims the benefit and priority of U.S. Provisional Patent Application No. 61/005,614, filed on Dec. 5, 2007, entitled "Community Translation on a Social Network," which are incorporated by reference herein in their entirety.

BACKGROUND

This invention relates to social networks and in particular to translating content on a social network.

Social networks, or social utilities that track and enable connections between members (including people, businesses, and other entities), have become prevalent in recent years. In particular, social networking systems allow members to communicate relevant information more efficiently. For example, a member may post contact information, background information, job information, hobbies, and/or other member-specific data to a location associated with the member on a social networking system. Other members can then review the posted data by browsing member profiles or searching for profiles including specific data. The social networking systems also allow members to associate themselves with other members, thus creating a web of connections among the members of the social networking system.

Various members of the social networking system may be competent in different languages (e.g., French, English). As a result, a member may not be able to understand information posted by another member if that posted information is not in a language known by the member. Such language barriers may reduce the range of useful connections that a member may make to other members. Also, a member may not be able to understand text provided by the social networking system itself if the language of that text is not known to the member. This text may include instructions, menu items, and button labels (e.g., "Click to submit") provided by the social networking system.

Conventionally, text is translated manually by a system operator into various desired languages. However, this requires effort and/or expense by the system operator. Another option is automated translation of text based on foreign language dictionaries, translation algorithms, or other methods. However, automated translation is generally difficult and error prone, often changing the meaning of the translated text or producing non-idiomatic translations. As a result, desired translations may not be produced, and members who need the translations will not be able to properly use the social networking system or will not be able to connect well with members who use certain languages.

SUMMARY

Addressing these deficiencies in existing systems, embodiments of the invention provide techniques for more effectively and easily translating text in a social networking system. In one embodiment, translations of text phrases are received from members of the social network. These text phrases can be from social networking system objects, including external applications running on the social networking system, or from the social networking system infrastructure. Members of the social networking system then vote on the received translations. The votes indicate the perceived quality of the translations by the voting members.

A translation is requested by a particular member, for example by the member viewing a webpage with a translatable phrase and the member indicating that a translation is desired. A translation can then be selected from among available translations based on the votes and other factors. The votes may be used to determine quality scores for the translations. Weights, or credibility coefficients, may be assigned to the votes for determining quality scores. A weight of a vote may be based on quality scores for translations submitted by the voter. Votes by voters who are a friend of the particular member may be weighted more heavily than votes by others. A translation is selected based on quality scores for available translations and based on which translations were viewed by or were rejected by friends of the member. The selected translation is then presented to the member.

BRIEF DESCRIPTION OF THE DRAWINGS

FIG. 8 illustrates a sample screen displaying a translation and a confidence level in a popup window The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social network offers its members the ability to communicate and interact with other members of the social network. In use, members join the social network and then add connections to a number of other members to whom they desire to be connected. Connections may be added explicitly by a member, for example, the member selecting a particular other member to be a friend, or automatically created by the social network based on common characteristics of the members (e.g., members who are alumni of the same educational institution). As used herein, the term "friend" refers to any other member to whom a member has formed a connection, association, or relationship via the website. Connections in social networks are usually in both directions, but need not be, so the terms "member" and "friend" may depend on the frame of reference. For example, if Bob and Joe are both members and connected to each other in the website, Bob and Joe, both members, are also each other's friends. The connection between members may be a direct connection; however, some embodiments of a social network allow the connection to be indirect via one or more levels of connections. Also, the term friend need not require that members actually be friends in real life, (which would generally be the case when one of the members is a business or other entity); it simply implies a connection in the social network.

Social networks can be implemented in various types of systems. The implementation of the social network can provide mechanisms for members to communicate with each other, form connections with each other, store information, and share objects of interest, among other things. The implementation can also provide mechanisms for displaying content (e.g., text, graphics) to members, including content provided by users and by the social networking system.

The implementation of a social networking system described below includes a social networking website that interacts with members at client computing devices through a web-based interface. However, other implementations are possible, such as one or more servers that communicate with clients using various client and server applications (e.g., non-web-based applications). Additionally, a social networking system may not include any centralized server, but rather may be implemented as a peer-to-peer system with peer-to-peer applications running on the clients that allow members to communicate and perform other functions. One example is a peer-to-peer network of smart phones communicating via Short Message Service (SMS) over a cellular network. It can be appreciated that the embodiments of a social networking website described below can be adapted to various other implementations of social networking systems.

Figure 1:
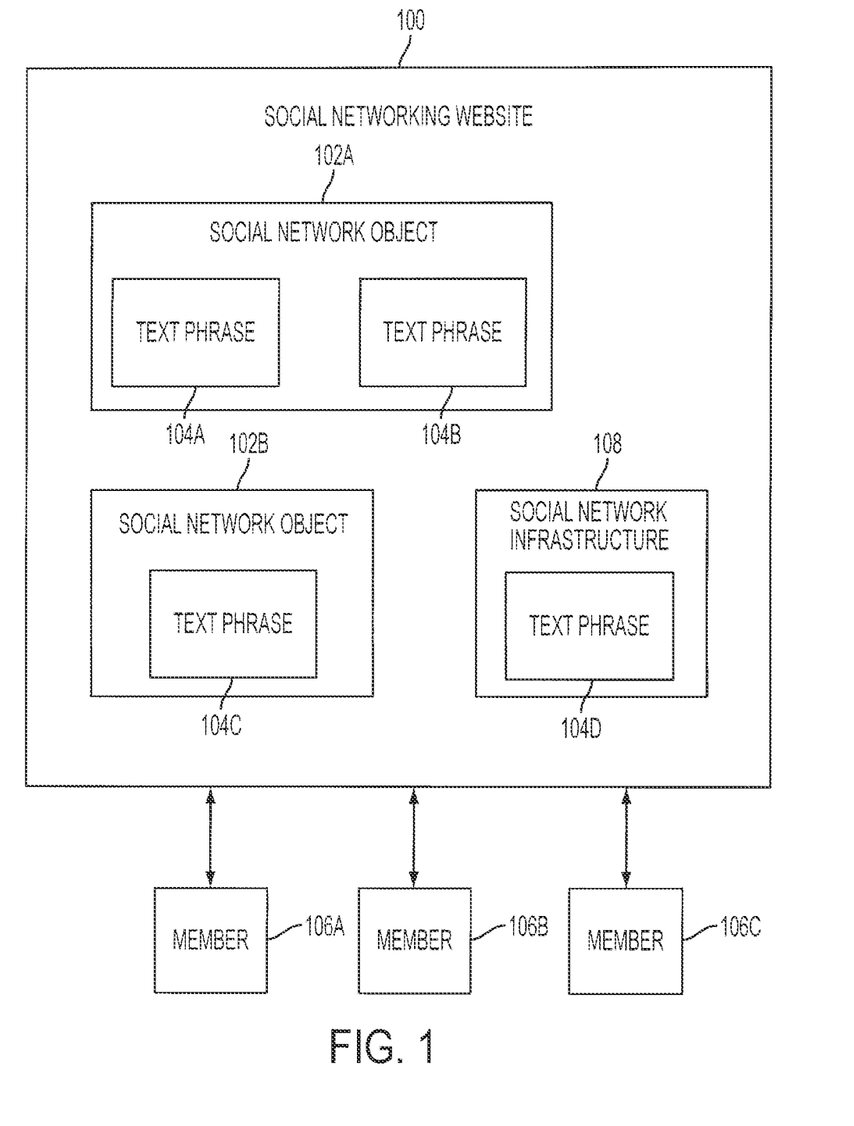
FIG. 1 illustrates a social network implemented as a social networking website, in one embodiment.

FIG. 1 illustrates a social network implemented as a social networking website 100, in one embodiment. The social networking website 100 provides various mechanisms to its members to communicate with each other or to obtain information that they find interesting, such as activities that their friends are involved with, applications that their friends are installing, and comments made by friends on activities of other friends, just to name a few examples.

In addition to interactions with other members, the social networking website 100 provides members with the ability to take actions on various types of items supported by the website. These items may include groups or networks (where "networks" refers not to physical communication networks, but rather to social networks of people) to which members of the website may belong, events or calendar entries in which a member might be interested, computer-based applications that a member may use via the website, and transactions that allow members to buy, sell, auction, rent, or exchange items via the social networking website 100. These are just a few examples of the items upon which a member may act on the social networking website 100, and many others are possible.

As illustrated in FIG. 1, the social networking website 100 maintains a number of social network objects 102 for the different kinds of items with which a member 106 may interact on the website 100. In one example embodiment, these objects include member profiles, group objects, event objects, application objects (respectively, hereinafter, profiles, groups, events, and applications). In one embodiment, a social network object 102 is stored by the website 100 for each instance of its associated item. For example, a member profile object is stored for each member who joins the website 100, a group object is stored for each group defined in the website 100, and so on. These social network objects 102 may include one or more text phrases 104. Examples of text phrases 104 include profile data or event descriptions. Each text phrase 104 is in a particular language, such as English.

The member 106 of the website 100 may take specific actions on the website 100, where each action is associated with one or more social network objects 102. The types of actions that a member may perform in connection with an object are defined for each object and largely depend on the type of item represented by the object. Generally a member 106 of the social networking website 100 can add content to a social network object 102, including text phrases 104. These text phrases 104 may then be viewed or possibly modified by other members. Member profiles, group objects, and event objects are managed by the social networking website 100, and the content of these objects, including text phrases 104, are stored in the social networking website 100.

The social networking website 100 also enables members 106 to add applications to their profiles. These applications provide enhanced content and interactivity within the social networking website 100, which maintains an application object, a type of social networking object 102, for each application hosted in the system. The applications may be provided by the website operator and/or by third party developers. An example application is an enhanced messaging service, in which members can send virtual objects (such as a "gift" or "flowers") and an optional message to another member. The application may display various text phrases 104 to members. Applications are generally written as server-side code that is run on servers of the social networking website 100 or on an external application server; an application may also use client-side code as appropriate.

The social networking website 100 may also include a social network infrastructure 108 containing content created by the social networking website 100 operator for the functioning of the social networking website 100. This content may include toolbars, menus, instructional text, button labels, and labels describing information from social network objects (e.g., the phrase "Name:" displayed before the name field of a profile). This content includes text phrases 104 written in a particular language (or languages).

Figure 2:
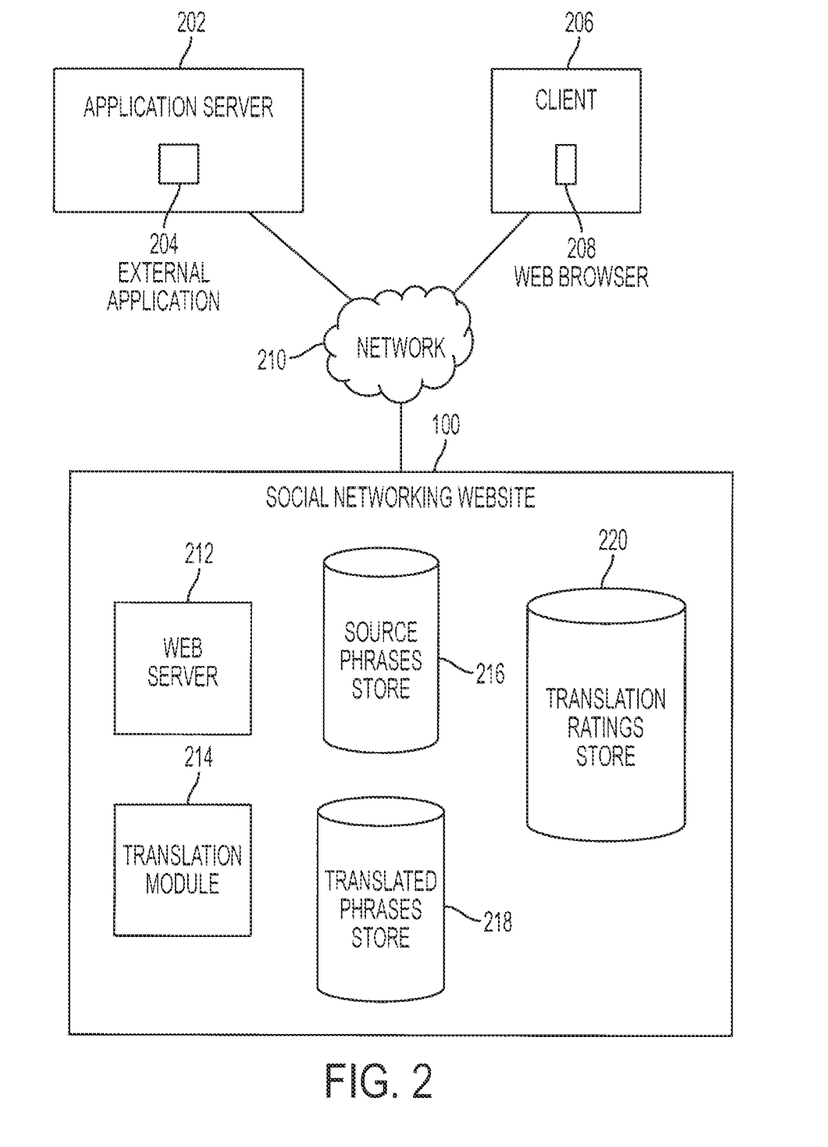
FIG. 2 is a high level block diagram illustrating a system environment suitable for operation of a social networking website, in one embodiment.

FIG. 2 is a high level block diagram illustrating a system environment suitable for operation of a social networking website 100, in one embodiment. The system environment comprises one or more client devices 206, one or more application servers 202, a social networking website 100, and a network 210. In alternative configurations, different and/or additional modules can be included in the system.

The client devices 206 comprise one or more computing devices that can receive member input and can transmit and receive data via the network 210. The client devices 206 can display text phrases 104 to members. For example, the client devices 206 may be desktop computers, laptop computers, smart phones, personal digital assistants (PDAs), or any other device including computing functionality and data communication capabilities. The client devices 206 are configured to communicate via network 210, which may comprise any combination of local area and/or wide area networks, using both wired and wireless communication systems. The client devices 206 may be running a web browser 208 that allows users at the client devices to view web pages served by the social networking website 100. These users may be members of the social networking website 100. Other applications similar to web browser 208 may also be run on the client device 206 to view content from the social networking website 100.

The social networking website 100 comprises a computing system that allows members to communicate or otherwise interact with each other and access content as described herein. The social networking website 100 stores member profiles that describe the members of a social network, including biographic, demographic, and other types of descriptive information, such as work experience, educational history, hobbies or preferences, location, and the like. The website 100 further stores data describing one or more relationships between different members. The relationship information may indicate members who have similar or common work experience, group memberships, hobbies, or educational history. Additionally, the social networking website 100 may include member-defined relationships between different members, allowing members to specify their relationships with other members. For example, these member-defined relationships allows members to generate relationships with other members that parallel the members' real-life relationships, such as friends, co-workers, partners, and so forth. Members may select from predefined types of relationships, or define their own relationship types as needed.

The application server 202 comprises a computing device that hosts external applications 204 for the social networking website 100. These external applications 204 may provide various services for members of the social networking website 100 as described above. The external applications 204 execute on the application server 202 and communicate with the social networking website 100 to display content to members, receive input from members, and modify stored data on the social networking website 100. As mentioned above, these external applications 204 may include text phrases 104 in various languages.

FIG. 2 contains a block diagram of the social networking website 100. In this embodiment, the social networking website 100 includes a web server 212, a translation module 214, a source phrases store 216, a translated phrases store 218, and a translation ratings store 220. In other embodiments, the social networking website 100 may include additional, fewer, or different modules for various applications. Conventional components such as network interfaces, security mechanisms, load balancers, failover servers, management and network operations consoles, and the like are not shown so as to not obscure the details of the system.

The web server 212 links the social networking website 100 via the network 210 to one or more client devices 206. The web server 212 serves web pages, as well as other web-related content, such as Java, Flash, XML, and so forth. The web server 212 may include a mail server or other messaging functionality for receiving and routing messages between the social networking website 100 and the client devices 206. The messages can be instant messages, queued messages (e.g., email), text and SMS messages, or any other suitable messaging technique. The web pages or messages provided by the web server may include text phrases 104.

The translation module 214 enables the translation of text phrases 104 that are displayed to members of the social networking website 100. As mentioned above, these text phrases 104 may be a part of various social networking objects 102 or may be part of the social network infrastructure 108. Members 106 of the social networking website 100 may be competent in different languages (e.g., French, English). As a result, certain members may not be able to understand certain text phrases 104 unless they are translated. The translation module 214 thus facilitates translation of these text phrases 104 to enable more text phrases to be understood by more members 106. These translations may enable better communications among members 106 who do not understand the same languages. The translations may also enable better use of the social networking website 100 by members that do not understand the language of the text phrases 104 used for the social network infrastructure 108. The translation module 214 may facilitate community translations of text phrases 104 by members 106 of the social networking website 100, further described below.

The source phrases store 216 contains text phrases 104 originally created by members 106, by an operator of the social networking website 100, or by an application running in the social networking website 100. These text phrases 104 are referred to as source phrases. Source phrases may include, for example, text that a member inputs to the social networking website 100 for display on the member's profile. Source phrases may also include social network infrastructure text created by an operator. Source phrases may be in any language. A single source phrase may be in multiple languages, for example, if a member manually created multiple language versions of the member's profile. The translated phrases store 218 contains translated versions of text phrases 104 in the source phrases store 216 along with a tag or indication of the language of translation and the identity of the member submitting the translation. These text phrases are referred to as translated phrases or translations. A source phrase may have several corresponding translated phrases in different languages. The source phrases store 216 may include references to corresponding translated phrases.

The translation ratings store 220 includes ratings of the translated phrases in the translated phrases store 218. These ratings may indicate the perceived quality of the translated phrases by members of the social networking website 100, and the ratings may be used for determining which translated phrases to display when a translation of a source phrase is requested. The translation ratings store 220 may store votes, weights, and quality scores for translations as described below.

Figure 3:
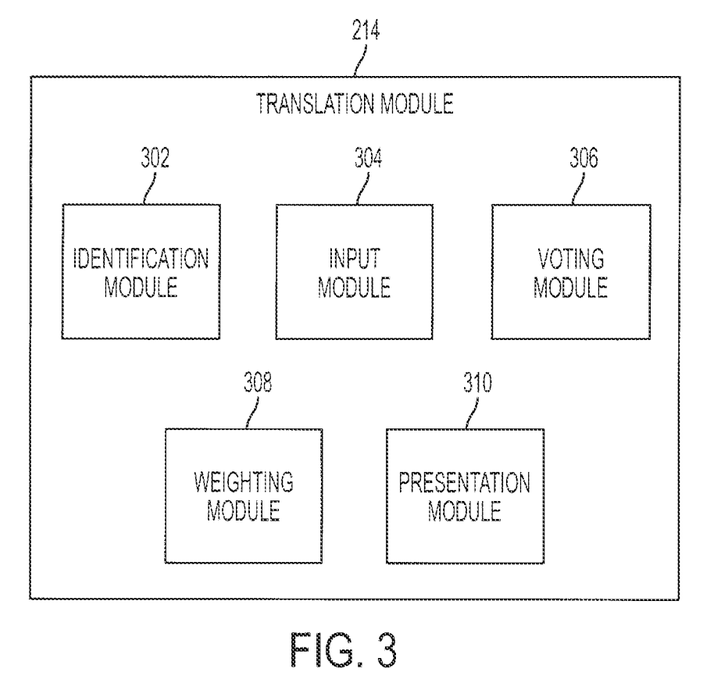
FIG. 3 is a high level diagram illustrating the translation module, in one embodiment.

FIG. 3 is a high level diagram illustrating the translation module 214, in one embodiment. The translation module 214 facilitates community translations of text phrases 104 in the social networking website 100 by members of the social networking website. The translation module 214 is also configured to present translated phrases to members when needed. By using members of the social networking website 100 to translate the text phrases 104, translation effort and/or expenses are reduced for the social networking website operator. The quality of the translations by members can be rated through a community-based rating system so that only high quality translations are displayed when a translation is requested. The translation module 214 may be implemented as one or more applications within the social networking website 100. For example, a translation application may be installed and activated by a member. Once activated, the member may be provided with user interfaces for inputting translations and for displaying translations.

The translation module 214 includes an identification module 302, an input module 304, a voting module 306, a weighting module 308, and a presentation module 310. The identification module 302 is configured to identify source phrases within the social networking website 100 that can be translated by a particular member. These source phrases may be text phrases 104 of social networking objects 102 or of the social networking infrastructure 108. The identification module 302 may also be aware of which languages a member knows and be configured to identify translations that are needed in those languages.

The input module 304 may receive translations of source phrases by members of the social networking website 100. These source phrases may have been identified using the identification module 302. The input module 304 is capable of presenting a user interface to a member that displays source phrases and requested translation languages. The user interface can then receive translated phrases from the member and store them in the translated phrases store 218.

The voting module 306 may enable members to vote on the quality of translated phrases submitted by other members through the input module 304. The voting module 306 is capable of presenting a user interface to a member that displays source phrases and corresponding translated phrases. The user interface can receive a vote from the member indicating the member's perceived quality of the translation. The voting module 306 is capable of collecting votes and storing them in the translation ratings store 220. The identity of the member submitting a vote may also be stored with each vote in the translation ratings store 220.

The weighting module 308 is configured to assign weights to votes collected by the voting module 306. A weight of a vote may indicate the voter's credibility and be based on the voter's translation ability (as determined by votes received for the voter's translations). The weighting module 308 is also capable of calculating a quality score for a translation based on the weighted votes. The weighting module 308 may store weights and scores in the translation ratings store 220.

The presentation module 310 is configured to present translated phrases to members when needed. The translated phrases may be presented through various user interfaces and may be presented automatically or based on a request from a member. The selection of a translated phrase to present may be based on quality scores determined by the weighting module 308.

Figure 4:
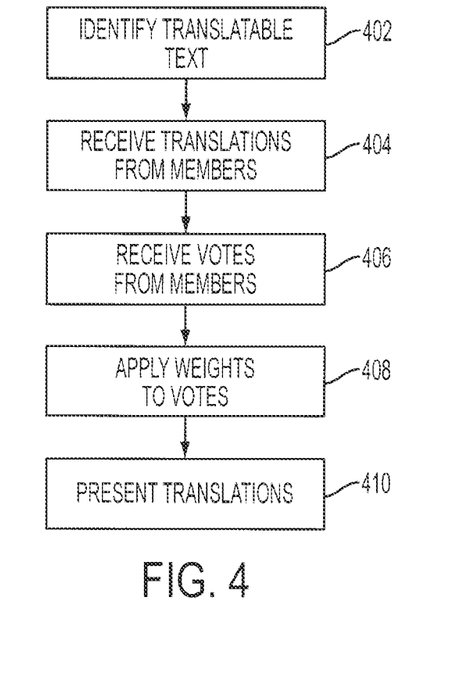
FIG. 4 illustrates a method for translating text phrases in a social networking website 100, in one embodiment.

Embodiments of the system described above can be used for translating text phrases in a social networking website 100. FIG. 4 illustrates a method for translating text phrases 104 in a social networking website 100, in one embodiment. Initially the identification module 302 identifies 402 translatable text, or source phrases, for translation by a particular member. The identification module 302 may identify the source phrases responsive to a request received from the member indicating the member is interested in translating text. For example, the member may click on a "Find text to be translated" button in a translation application in the social networking website 100. The identification module 302 may also receive input from the member to identify more appropriate text for translation. For example, the identification module 302 may receive information from the member specifying a translation language.

The identification module 302 may then identify source phrases that can be translated to that language (i.e., phrase that are not in the desired language but are in a language that the translation module 214 is capable of translating to the desired language). The identification module 302 obtains source phrases for translation from text phrases 104 within social network objects 102 or from the social network infrastructure 108, in one embodiment. Social network objects 102 can include application objects created by an external application 204. The identification module 302 may store identified source phrases in the source phrases store 216.

Next, the input module 304 receives 404 translations from members. The input module 304 can receive source phrases for translation from the identification module 302 or from the source phrases store 216. In one embodiment, the input module 304 presents a user interface to a member that displays source phrases for translation and receives translations from the member. The user interface may be displayed responsive to a selection by the member indicating that the member desires to provide translations of phrases (e.g., the member selects a "translate phrases" button).

Figure 5:
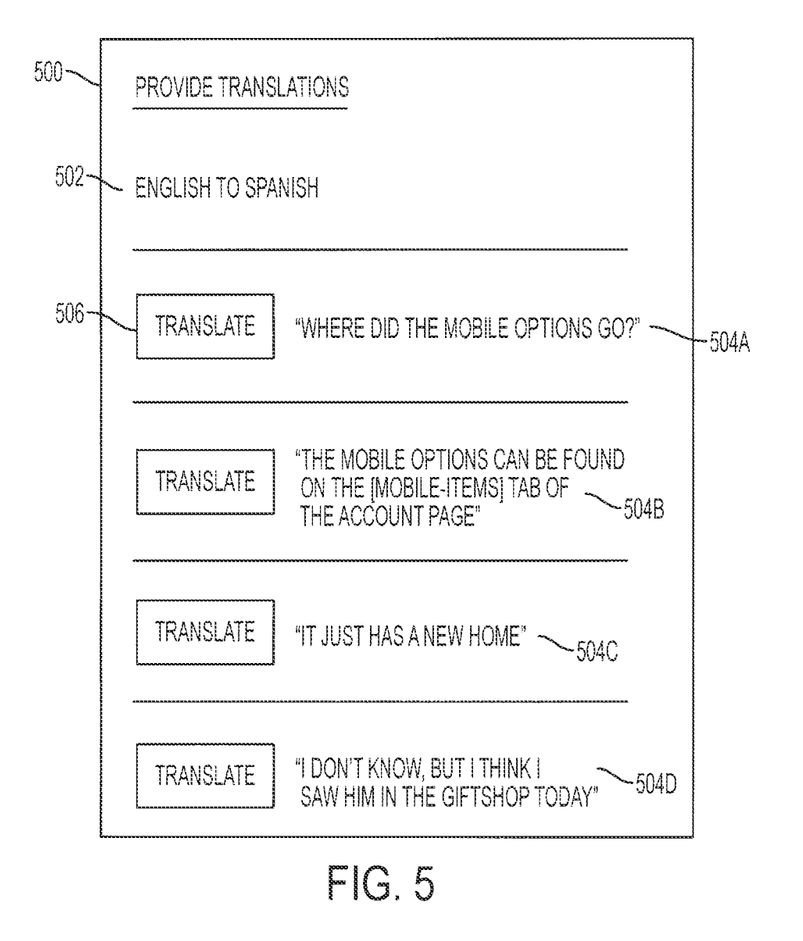
FIG. 5 illustrates a sample screen from a user interface for receiving translations from a member, in one embodiment.

FIG. 5 illustrates a sample screen 500 from a user interface for receiving translations from a member, in one embodiment. The screen 500 may be displayed in the web browser 208 of a member of the social networking website 100. The screen 500 includes a list of source phrases 504 identified for translation by the identification module 302. The screen 500 also includes a language indication 502 that displays the requested translation languages for the source phrases 504. In this case the requested translation is from English to Spanish.

Some source phrases 504 may include "tokens" that are not intended to be translated along with a phrase, but rather are placeholders for text to be included in the translated phrase when it is displayed. For example, phrase 504B includes the token "[mobile-items]". The token is displayed in brackets to indicate to the member providing the translation that it is a token. When the translated text is later displayed to a member needing a translation, the token is replaced with appropriate text. For example, the "[mobile-items]" token may be replaced with a particular tab name, such as "Mobile", used by the social networking website 100. The text that replaces the token may be previously translated text, and the use of a token can avoid re-translating a word or phrase for which a high quality translation is already available.

Figure 6:
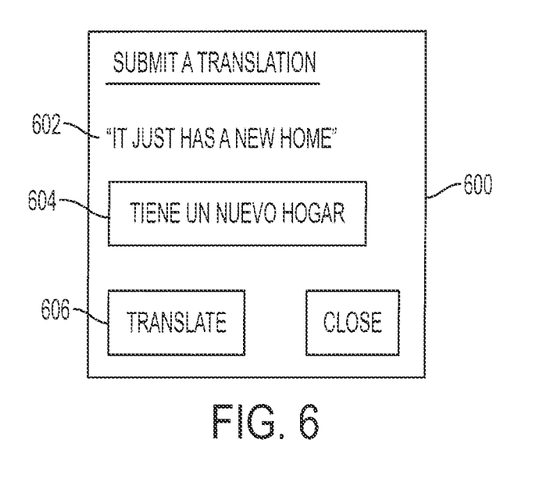
FIG. 6 illustrates a sample translation input screen displayed to the member after selecting a translate button, in one embodiment.

The member can select a source phrase 504 to translate by selecting the translate button 506 corresponding to the desired source phrase. FIG. 6 illustrates a sample translation input screen 600 displayed to the member after selecting the translate button 506 corresponding to source phrase 504C. The translation input screen 600 may be a pop-up screen displayed over the screen 500 illustrated in FIG. 5. The translation input screen 600 displays the source phrase 602 to be translated and provides an input text box 604 to receive the member's translation. In the illustrated input text box 604, the member has typed in a translation based on the member's knowledge of Spanish (and English). The member then selects the translate button 606 to submit the translation to input module 304. In one embodiment, the translation is then stored in the translated phrases store 218, and the source phrases store 216 is updated so that the corresponding source phrase is linked to the new translated phrase.

The translation input screen 600 can also include additional information to assist the user in providing a high quality translation. In one embodiment, the additional information can describe the context of the source phrase. For example, if the source phrase is "Save", the context information may state "A button used to save your settings" to clarify the intended meaning of "Save". Various separate translations can be obtained for the same source phrase used in different contexts.

The translation input screen 600 may also provide a "tokenizer" for inserting tokens into the translated phrase if the source phrase includes tokens. For example, if the member is translating source phrase 504B, a button or link can be provided in the translation input screen 600 for inserting the token "[mobile-items]" into the translated phrase in the text box 604. The member can position the cursor at an appropriate point in the text box 604 and select the button or link, causing the input module 304 to automatically insert the token into the translated phrase. In one embodiment, the system may require that all tokens be used for the translation to be accepted.

In one embodiment, a member may submit a translated phrase from any location in the social networking website, rather than from a specially provided screen 500 for receiving translations. For example, the member may select a particular text phrase 104 that the member desires to translate. This phrase may appear in a social network object 102 or in social network infrastructure 108 the member is viewing on a currently displayed webpage. The phrase may originate from an external application 204 or other source external to the social networking website 100. The member may highlight the desired phrase in the member's web browser 208 and make a selection to indicate that the member wants to translate the highlighted phrase (e.g., using a menu or a button). Then, a translation input screen 600 can be displayed in a popup window to receive the translation. In one embodiment, the identification module 302 may identify possible phrases for translation on a particular web page and highlight these phrases. The member can then make a selection from among the highlighted phrases.

The input module 304 may provide various features to assist members in translating text phrases. The input module 304 may provide a discussion board so that members may discuss issues regarding specific translations. Members use the discussion board to view what has been discussed about a specific translation before submitting a new translation or voting on the translation. The input module 304 may also provide a glossary and/or style guide to assist a member in creating a translated phrase or in voting on translated phrases. The input module 304 may also include a spell-check for various languages. The input module 304 may display previously submitted translations for text phrases that are similar to the text phrase being translated to assist the member in translating. The input module 304 may allow a member to view his or her previously submitted translations and edit the submitted translated phrases, updating the translated phrases store 218.

Returning to FIG. 4, the voting module 306 receives 406 votes on translations from members, in one embodiment. The member votes on various translated phrases, the vote indicating the member's perceived quality of the translation. In one embodiment, the member is not permitted to vote on translations submitted by that member. Received votes can be stored in the translation ratings store 220. Along with each vote can be stored the identity of the member submitting the vote and a link to the translation voted on in the translation store 218.

Figure 7:
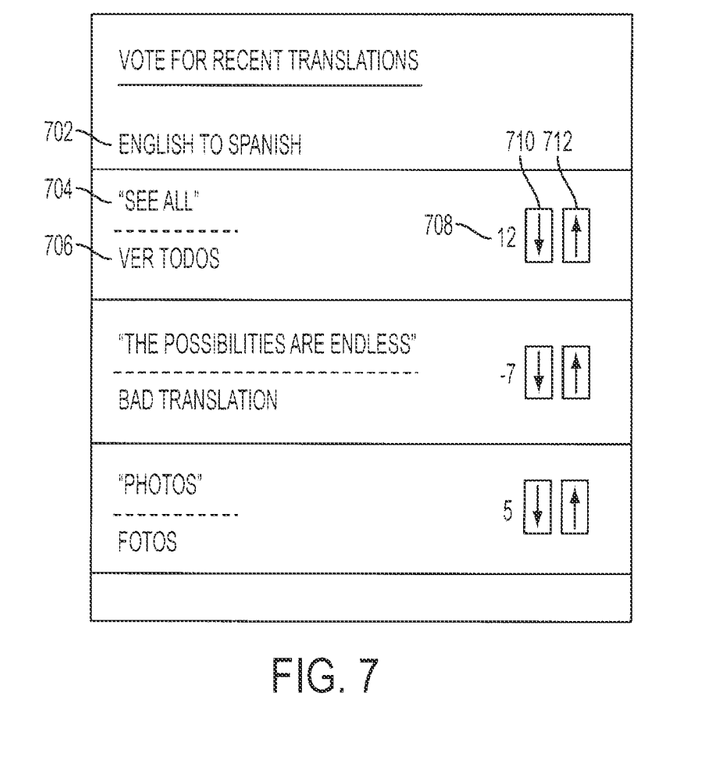
FIG. 7 illustrates a sample voting screen for receiving votes on translated phrases, in one embodiment.

FIG. 7 illustrates a sample voting screen 700 for receiving votes on translated phrases. The voting screen 700 is provided by the voting module 306 and may be displayed to a member responsive to receiving an indication that the member desires to vote on translations, for example by the member selecting a "Vote on translations" button in the social networking website 100. The voting screen 700 includes an identification 702 of the language of the source phrases 704 and corresponding translated phrases 706. The translated phrases 706 were created by members using the input module 304, in one embodiment.

To indicate that a particular translation is of high quality, a member selects the vote-up button 712 corresponding to the translation. To indicate that a particular translation is of low quality, a member selects the vote-down button 710 corresponding to the translation. In one embodiment, a member is only allowed to submit one vote for each translation. A vote total 708 may be displayed for a translation, possibly only after the member has submitted a vote for the translation. A higher vote total indicates translation that has a perceived higher quality by members of the social networking website 100. The voting screen 700 may also include a button for voters to flag vulgar or offensive translations for review by an operator of the social networking website. This flagging feature may also include an option to indicate the reason for flagging.

In one embodiment, steps 402, 404, and 406 described above comprise a data gathering portion of a method for translating text in a social networking website. Members may submit translations for various text phrases and these text phrases may be voted on by other members. The submitted translations and votes are stored in the translated phrases store 218 and translated ratings store 220 as described above. The translations and votes, along with related information such as the identities of the submitters of the translations and votes, are then retrieved and processed responsive to a request to view a translation. This request to view a translation may originate from a member viewing text for which a translation is available and the member making a selection to request a translation, for example. A request to view a translation can also be automatically generated by the social networking website. The processing responsive to a request to view a translation includes the steps performed by the weighting module 308 and the presentation module 310 as described below. These modules select and present a translation to a particular member that is appropriate for that member.

The weighting module 308 applies 408 weights to the votes received by the voting module 306 and determines a weighted quality score for each translation. The weight assigned to a particular vote is also referred to as the vote's credibility coefficient. In one embodiment, the weight assigned to a vote represents an estimate of the ability of the voter to translate content or the ability of the voter to evaluate translated content. For example, a vote by a voter who has previously submitted translations that received a relatively high number of positive votes may be assigned a larger weight than a vote by a voter who has received a relatively high number of negative votes for submitted translations. A value of a vote (e.g., 1 for an up vote and −1 for a down vote) can be multiplied by the vote's weight to determine the vote's contribution to the weighted quality score for the translation. Votes that are given heavier weights have a greater effect on the weighted quality score determined for the translated phrase. The vote total 708 displayed on the voting screen may be an unweighted vote count or a weighted quality score. In one embodiment, a translation with a higher weighted quality score is preferred over a translation with a lower weighted quality score when choosing a translation to present to members.

The weighted quality score may also take into account various factors to make it more customized to the member requesting the translation. As mentioned above, a member may have several friends in a social networking website. The member may consider these friends more trustworthy than other members of the social networking website that the member doesn't know. As a result, votes from friends of the member may be more heavily weighted than votes from others. In one embodiment, only the votes from friends of the member are considered in determining the weighted quality score. Additionally, when determine weights to assign to votes, only friends of the member can be considered. In this case, for example, only votes by friends of the member on a previous submission by the voter are considered in determining the weight of a vote by the voter.

The weighting module 308 may also determine a translation controversy index for a particular translation based on voting patterns. The translation controversy index may be used to identify translations that are the subject of contested or controversial voting patterns. For example, a translation receiving 100 up votes and 98 down votes may be assigned a high controversy index and be considered controversial. The weights of votes and the competitiveness of the voting pattern may be taken into account when determining the translation controversy index. In one embodiment, a translation with a low controversy index is preferred over a translation with a high controversy index when choosing a translation to present to members.

The presentation module 310 presents 410 the translated phrases to members to enable the members to better understand text phrases 104 in the social networking website 100. In one embodiment, the presentation module 310 receives an indication from a member that the member desires to view translated phrases. The member may indicate which text phrases to display in translated form. These can include all text phrases, all text phrases on the currently displayed webpage, or certain types of text phrases, for example. As mentioned above, text phrases from external application 204 on an application server 202 outside of the social networking website 100 may be translated. Also, text phrases from the social networking website infrastructure 108 may be translated.

The presentation module 310 retrieves translated phrases from the translated phrases store 218 corresponding to source phrases for which a translation is desired. In one embodiment a member activates a "translation mode" to view translated phrases. In one embodiment, the translation mode is activated by selecting a control (e.g., checking a box) on a webpage of the social networking website 100. This selection is received by the presentation module 310, and the presentation module displays translated phrases until the translation mode is deactivated. The presentation module may also receive a selection of a translation language from the member. For example, the member may specify the translation language through a pull-down menu on a webpage of the social networking website 100.

The presentation module 310 may display translated phrases in place of the original text phrases 104 on a displayed webpage. The translated phrases may be highlighted, underlined, or displayed in a different color from untranslated phrases. In one embodiment, only the original untranslated text is displayed on the webpage, but text phrases with a translation available are highlighted. A member viewing the webpage then selects or mouses-over a highlighted text phrase to display the translation in a pop-up window. A member may be able to submit votes on translated text presented by the presentation module 310. A member may also be able to request an alternate translation. The member may do this if the currently displayed translation doesn't make sense to the member.

The presentation module 310 may receive a selection indicating that only translations submitted by a particular member or set of members are to be displayed. For example, a member may specify that only translations by that member and that member's friends should be displayed. A member may also specify that only translations that have received a certain number of votes and/or a certain quality score should be displayed. If multiple translations are available for a particular text phrase, the presentation module 310 may choose a translation to display based on various factors such as weighted or unweighted quality scores or translation controversy indexes determined by the weighting module 308. The presentation module 310 only displays translations having a quality score above a predetermined threshold, in one embodiment. As mentioned above, this quality score may take into account the connections a member has within the social networking website, such as weighting votes from the member's friends more heavily.

The presentation module 310 may also use other information to determine which translation to present to a member. In particular, the presentation module 310 may use information associated with the member's friends (or other connections) since the member may generally find the member's friends to be trustworthy and to have interests in common with the member. This information may comprise relationships between the member's friends and the translations available for selection. For example, translations viewed by friends of the member can be selected for presentation to the member. A translation frequently viewed by friends of a member can be automatically displayed to a member without requiring the member to select the appropriate source phrase on the displayed webpage for translation. Similarly, translations rejected by friends of the member can be avoided for presentation to the member (even if the translation has been voted highly overall). For example, if several of a member's friends requested alternate translations when a particular translation was displayed, that translation can be avoided when selecting a translation to present to the member.

Also, as mentioned above, the submitters of the translations may be used in deciding which translation to select for display to a member. A translation submitted by a friend of the member may be preferred over a translation submitted by someone else. Similarly, a translation submitted by someone who has generally received good votes from friends of the member may be preferred over other translations, even if the submitter is not a friend of the member. In one embodiment, a member may identify certain friends as being good translators, and the presentation module may give preference to translations by those friends when selecting a translation. In one embodiment, friends (or other members) of the social networking website that are members of a "translators" group may have their translations preferred by the presentation module. A translators group may be a group of the social networking website where membership is restricted to members consistently producing high quality translations (as determined by a group moderator, for example).

The presentation module 310 may also display a confidence level along with a displayed translation. This confidence level may be expressed on a particular scale, such as from 0% to 100% or may be expressed using a graphical indication (e.g., a color). The confidence level may be derived from the weighted quality score or translation controversy index associated with the translation. This confidence level may take into account the member's friends, such as weighting votes by friends more heavily in the quality score. The confidence level may provide an indication of what percentage of the member's friends have viewed this translation and what percentage of the member's friends have requested alternate translations when shown this translation. Generally, the translation with the highest confidence level is displayed first to a member. The presentation module 310 may also display information about specific friends, such as which friends viewed the translation or which friends requested an alternate translation.

Figure 8:
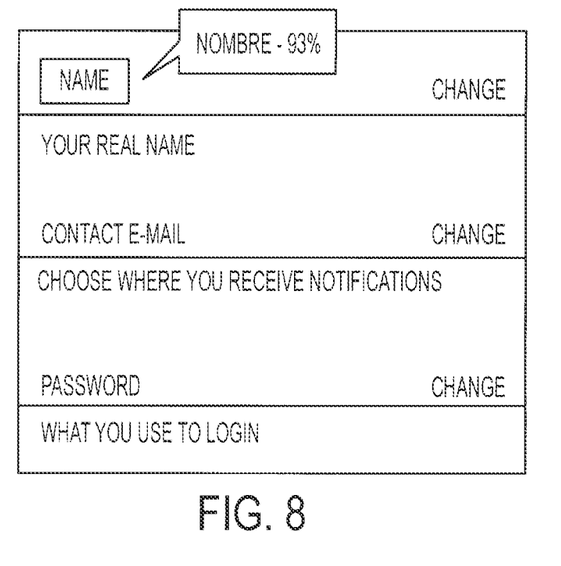

FIG. 8 illustrates a sample screen from the social networking website 100 with a translation and a confidence level displayed in a popup window. This window may be displayed responsive to a user selecting the phrase "Name".

The presentation module 310 may also display statistics concerning available translations in the social networking website 100 (or in a portion of the social networking website). For example, a map of the world or other visual representation may be displayed showing statistics concerning translated content and/or the languages translated. One such statistic could display the number of translations available in a particular language on countries on a world map where the particular language is commonly spoken.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
for each of a plurality of members of a social networking system, maintaining a respective set of connections to other members of the social networking system;
selecting, by a computer system and for a text phrase in a first language, a translation of the text phrase from a set of translations of the text phrase in a second language, wherein the selecting is based on one or more actions by one or more other members identified in the set of connections for a particular member maintained by the social networking system, wherein the actions are associated with translations from the set of translations; and
presenting the selected translation of the text phrase to the particular member.

2. The method of claim 1, wherein the text phrase comprises a portion of a social networking system object.

3. The method of claim 2, wherein the social networking system object comprises an external application.

4. The method of claim 1, wherein the text phrase comprises a portion of a social networking system infrastructure.

5. The method of claim 1, wherein the selecting is based on which of the translations from the set of translations were viewed by the one or more other members connected to the particular member.

6. The method of claim 1, wherein the selecting is based on which of the translations from the set of translations were created by the one or more other members connected to the particular member.

7. The method of claim 1, wherein the selecting is based on which of the translations from the set of translations were rejected by the one or more other members connected to the particular member, the rejecting of a translation comprising a member connected to the particular member requesting an alternate translation after viewing the translation.

8. The method of claim 1, further comprising:
determining quality scores for the translations in the set of translations based on votes received from voting members of the social network, each vote indicating the voting member's perceived quality of the translation; and
wherein the selecting is based on a comparison of the quality scores for the translations in the set of translations.

9. The method of claim 8, further comprising:
determining a weight for each received vote, the weight indicating the vote's relative contribution to the quality score.

10. The method of claim 9, wherein the weight of a vote submitted by a voting member is based on the perceived quality among members of translations previously submitted by the voting member.

11. The method of claim 9, wherein the weight of a vote submitted by a voting member who is connected to the particular member is weighted more heavily than a vote submitted by a voting member who is not connected to the particular member requesting the translation.

12. The method of claim 1, wherein presenting the selected translation to the member further comprises:
displaying a confidence level associated with the selected translation, the confidence level based on actions by the one or more other members connected to the particular member in the social network, the actions associated with translations from the set of translations.

13. The method of claim 1, wherein each of the set of connections is maintained by the social networking system in association with a user profile of each member.

14. A computer program product comprising a non-transitory computer-readable storage medium containing computer program code for:
for each of a plurality of members of a social networking system, maintaining a respective set of connections to other members of the social networking system;
selecting, by a computer system and for a text phrase in a first language, a translation of the text phrase from a set of translations of the text phrase in a second language, wherein the selecting is based on one or more actions by one or more other members identified in the set of connections for a particular member maintained by the social networking system, wherein the actions are associated with translations from the set of translations; and presenting the selected translation of the text phrase to the particular member.

15. The computer program product of claim 14, wherein the text phrase comprises a portion of a social networking system object.

16. The computer program product of claim 15, wherein the social networking system object comprises an external application.

17. The computer program product of claim 14, wherein the text phrase comprises a portion of a social networking system infrastructure.

18. The computer program product of claim 14, wherein the selecting is based on which of the translations from the set of translations were viewed by the one or more other members connected to the particular member.

19. The computer program product of claim 14, wherein the selecting is based on which of the translations from the set of translations were created by the one or more members connected to the particular member.

20. The computer program product of claim 14, wherein the selecting is based on which of the translations from the set of translations were rejected by the one or more members connected to the particular member, the rejecting of a translation comprising a member connected to the particular member requesting an alternate translation after viewing the translation.

21. The computer program product of claim 14, wherein the computer code is further configured for:
    determining quality scores for the translations in the set of translations based on votes received from voting members of the social network, each vote indicating the voting member's perceived quality of the translation; and
    wherein the selecting is based on a comparison of the quality scores for the translations in the set of translations.

22. The computer program product of claim 21, wherein the computer code is further configured for:
    determining a weight for each received vote, the weight indicating the vote's relative contribution to the quality score.

23. The computer program product of claim 22, wherein the weight of a vote submitted by a voting member is based on the perceived quality among members of translations previously submitted by the voting member.

24. The computer program product of claim 22, wherein the weight of a vote submitted by a voting member who is connected to the particular member is weighted more heavily than a vote submitted by a voting member who is not connected to the particular member requesting the translation.

25. The computer program product of claim 14, wherein presenting the selected translation to the particular member further comprises:
    displaying a confidence level associated with the selected translation, the confidence level based on actions by the one or more other members connected to the member in the social network, the actions associated with translations from the set of translations.

26. The computer program product of claim 14, wherein each of the set of connections is maintained by the social networking system in association with a user profile of each member.

* * * * *